United States Patent
Wang et al.

(10) Patent No.: US 12,376,189 B2
(45) Date of Patent: Jul. 29, 2025

(54) WIRELESS COMMUNICATION METHOD AND DEVICE

(71) Applicant: VIVO MOBILE COMMUNICATION CO., LTD., Chang'an Dongguan (CN)

(72) Inventors: Wen Wang, Chang'an Dongguan (CN); Yanchao Kang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 981 days.

(21) Appl. No.: 17/313,948

(22) Filed: May 6, 2021

(65) Prior Publication Data

US 2021/0258911 A1 Aug. 19, 2021

Related U.S. Application Data

(63) Continuation of application No. PCT/CN2019/115299, filed on Nov. 4, 2019.

(30) Foreign Application Priority Data

Nov. 7, 2018 (CN) .......................... 201811320312.5

(51) Int. Cl.
 *H04W 76/38* (2018.01)
 *H04W 8/30* (2009.01)
 (Continued)

(52) U.S. Cl.
 CPC ............ *H04W 76/38* (2018.02); *H04W 8/30* (2013.01); *H04W 48/18* (2013.01); *H04W 60/04* (2013.01);
 (Continued)

(58) Field of Classification Search
 CPC ..... H04W 76/38; H04W 76/25; H04W 76/30; H04W 8/30; H04W 48/18; H04W 60/04; H04W 60/00; H04W 72/04
 See application file for complete search history.

(56) References Cited

U.S. PATENT DOCUMENTS

2015/0296321 A1 10/2015 Kim et al.
2016/0066219 A1 3/2016 Polkonen et al.
(Continued)

FOREIGN PATENT DOCUMENTS

CN 104919829 A 9/2015
CN 107466115 A 12/2017
(Continued)

OTHER PUBLICATIONS

3rd Generation Partnership Project (3GPP) TS 23.501 V2.0.0 (Dec. 2017) (Year: 2017).*
3rd Generation Partnership Project (3GPP) TS 24.501 V15.1.0 (Sep. 2019) (Year: 2019) (Year: 2019).*
Indonesian first Office Action related to Application No. P00202104208; reported on Aug. 24, 2023.
International Search Report and Written Opinion related to PCT/CN2019/115299 reported on Jan. 17, 2020.
(Continued)

*Primary Examiner* — Michael J Moore, Jr.
(74) *Attorney, Agent, or Firm* — von Briesen & Roper, s.c.

(57) ABSTRACT

Embodiments of the present invention disclose a wireless communication method and a device. The method includes: receiving a configuration update command message, where the configuration update command message is used to instruct a terminal device to release a non-access stratum NAS signaling connection with a network device and initiate a mobile registration update procedure; and if a mobility management back-off timer is running at a reception occasion of the configuration update command message, stopping the mobility management back-off timer.

18 Claims, 3 Drawing Sheets

(51) Int. Cl.
*H04W 48/18* (2009.01)
*H04W 60/04* (2009.01)
*H04W 76/25* (2018.01)
*H04W 76/30* (2018.01)
*H04W 60/00* (2009.01)
*H04W 72/04* (2023.01)

(52) U.S. Cl.
CPC ............ *H04W 76/25* (2018.02); *H04W 76/30* (2018.02); *H04W 60/00* (2013.01); *H04W 72/04* (2013.01)

(56) References Cited

U.S. PATENT DOCUMENTS

| | | | |
|---|---|---|---|
| 2016/0255674 A1 | 9/2016 | Niemi et al. | |
| 2019/0342821 A1* | 11/2019 | Kim | H04W 74/0833 |
| 2019/0373441 A1 | 12/2019 | Ryu et al. | |
| 2020/0015311 A1* | 1/2020 | Kim | H04W 68/005 |
| 2020/0163145 A1* | 5/2020 | Park | H04W 76/18 |
| 2020/0336937 A1* | 10/2020 | Youn | H04W 76/12 |
| 2020/0389830 A1* | 12/2020 | Park | H04W 60/04 |
| 2020/0404734 A1* | 12/2020 | Watfa | H04W 76/25 |
| 2020/0413241 A1* | 12/2020 | Park | H04W 76/22 |
| 2021/0029628 A1* | 1/2021 | Kim | H04W 48/18 |
| 2021/0258911 A1* | 8/2021 | Wang | H04W 76/38 |

FOREIGN PATENT DOCUMENTS

| | | | |
|---|---|---|---|
| CN | 107529194 A | 12/2017 | |
| WO | 2018034924 A1 | 2/2018 | |
| WO | 2018131984 A1 | 7/2018 | |

OTHER PUBLICATIONS

Vivo; Correction to general NAS level congestion control; SA WG2 Meeting #124, Nov. 27-Dec. 1, 2018, Reno, USA, S2-178296.

Second Chinese Office Action related to Application No. 201811320312.5 reported on May 31, 2021.

Nokia Siemens Networks; "Network Initiated NAS Transport Message"; 3GPP TSG CT WG1 Meeting #75; San Francisco (CA), USA, Nov. 14-18, 2011; C1-114628.

3rd Generation Partnership Project; Technical Specification Group Services and System Aspects;System Architecture for the 5G System; Stage 2 (Release 15); 3GPP TS 23.501; V2.0.1; Dec. 2017.

3rd Generation Partnership Project; Technical Specification Group Core Network and Terminals; Non-Access Stratum (NAS) protocol for 5G System (5GS); Stage 3 (Release 16); 3GPP TS 24.501; V16.2.0; Sep. 2019.

Qualcomm Incorporated; "Alignment with terminology "emergency PDU session" throughout TS 24.501", 3GPP TSG-CT WG1 Meeting #112, West Palm Beach, FL, Aug. 20-24, 2018, C1-185163.

Extended European Search Report related to Application No. 19881758.7; reported on Nov. 5, 2021.

3rd Generation Partnership Project; Technical Specification Group Core Network and Terminals; 5G System—Phase1; CT WG1 Aspects (Release 15); 3GPP TR 24.890; V15.1.0; Mar. 2018.

3rd Generation Partnership Project; Technical Specification Group Core Network and Terminals; Non-Access-Stratum (NAS) protocol for 5G System (5GS); Stage 3 (Release 15); 3GPP TS 24.501; V15.1.0; Sep. 2018.

Japanese Office Action related to Application No. 2021-524453 reported on Jun. 28, 2022.

* cited by examiner

WIRELESS COMMUNICATION METHOD AND DEVICE

CROSS-REFERENCE TO RELATED APPLICATIONS

This disclosure is a continuation of PCT Application No. PCT/CN2019/115299 filed on Nov. 4, 2019, which claims priority to Chinese Patent Application No. 201811320312.5, filed in China on Nov. 7, 2018, which is incorporated herein by reference in its entirety.

TECHNICAL FIELD

This disclosure relates to the field of communications technologies, and in particular, to a wireless communication method and a device.

BACKGROUND

In a mobile communications system, an access and mobility management function (AMF), being overloaded, may reject a non-access stratum (NAS) request message of a terminal device. When the NAS request message is rejected, the AMF will add a mobility management back-off timer (MM back-off Timer) (for example, T3346) in the rejection message, and the AMF will alternatively store the mobility management back-off timer. The AMF will reject the NAS request message initiated by the terminal device before the mobility management back-off timer expires. Therefore, the terminal device cannot initiate any mobile registration update procedure before the MM back-off timer expires, causing that the terminal cannot restore a to-be-restored service or perform any subsequent services in time.

SUMMARY

Embodiments of the present invention are intended to provide a wireless communication method and a device, so as to solve the problem that a terminal device cannot initiate any mobile registration update procedure before a mobility management back-off timer expires, causing that the terminal device cannot restore a to-be-restored service or perform any subsequent services in time.

According to a first aspect, a wireless communication method is provided. Applied to a terminal device, the method includes: receiving a configuration update command message, where the configuration update command message is used to instruct the terminal device to release a non-access stratum NAS signaling connection with a network device and initiate a mobile registration update procedure; and if a mobility management back-off timer is running at a reception occasion of the configuration update command message, stopping the mobility management back-off timer.

According to a second aspect, a wireless communication method is provided. Applied to a network device, the method includes: transmitting a configuration update command message, where the configuration update command message is used to instruct a terminal device to release a non-access stratum NAS signaling connection with the network device and initiate a mobile registration update procedure; and if a mobility management back-off timer is running at a transmission occasion of the configuration update command message, stopping the mobility management back-off timer.

According to a third aspect, a terminal device is provided, where the terminal device includes: a transceiver module, configured to receive a configuration update command message, where the configuration update command message is used to instruct the terminal device to release a non-access stratum NAS signaling connection with a network device and initiate a mobile registration update procedure; and a processing module, configured to, if a mobility management back-off timer is running at a reception occasion of the configuration update command message, stop the mobility management back-off timer.

According to a fourth aspect, a network device is provided, where the network device includes: a transceiver module, configured to transmit a configuration update command message, where the configuration update command message is used to instruct a terminal device to release a non-access stratum NAS signaling connection with the network device and initiate a mobile registration update procedure; and a processing module, configured to, if a mobility management back-off timer is running at a transmission occasion of the configuration update command message, stop the mobility management back-off timer.

According to a fifth aspect, a terminal device is provided, including: a memory, a processor, and a computer program stored in the memory and capable of running on the processor, where when the computer program is executed by the processor, the steps of the wireless communication method according to the first aspect are implemented.

According to a sixth aspect, a network device is provided, including: a memory, a processor, and a computer program stored in the memory and capable of running on the processor, where when the computer program is executed by the processor, the steps of the wireless communication method according to the second aspect are implemented.

According to a seventh aspect, a computer-readable medium is provided, where the computer-readable storage medium stores a computer program, and when the computer program is executed by a processor, the steps of the method according to the first aspect are implemented.

According to an eighth aspect, a computer-readable storage medium is provided, where the computer-readable storage medium stores a computer program, and when the computer program is executed by a processor, the steps of the method according to the second aspect are implemented.

In the embodiments of the present invention, the terminal device receives the configuration update command message used to instruct the terminal device to release a NAS signaling connection with the network device and initiate a mobile registration update procedure, and determines whether the mobility management back-off timer is running at the reception occasion of the configuration update command message. If the mobility management back-off timer is running, the terminal device stops the mobility management back-off timer. Therefore, the problem can be avoided that the terminal device cannot restore a to-be-restored service or perform any subsequent services because the terminal device receives a configuration update command message during running of the mobility management back-off timer but cannot initiate a mobile registration update procedure.

BRIEF DESCRIPTION OF DRAWINGS

The drawings described herein are used to provide a further understanding about the present invention, and constitute a part of the present invention. Exemplary embodiments of the present invention and descriptions thereof are used to explain the present invention, but do not constitute any inappropriate limitation on the present invention. In the drawings.

DESCRIPTION OF EMBODIMENTS

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solution of the present invention can be applied to various communication systems, for example, a long term evolution (LTE)/long term evolution-advanced (LTE-A) system, a new radio (NR) system, and the like.

In the embodiments of the present invention, a terminal device (User Equipment, UE), also referred to as a mobile terminal, a mobile user equipment, or the like, may communicate with one or more core networks through a radio access network (for example, Radio Access Network, RAN). The user equipment may be a mobile terminal, for example, a mobile phone (also referred to as a "cellular" phone) and a computer provided with a mobile terminal, for example, may be a portable, pocket-sized, handheld, computer built-in, or in-vehicle mobile apparatus, which exchanges voice and/or data with the radio access network.

In the embodiments of the present invention, a network device is an apparatus for providing a wireless communication function for a terminal device. The network device may be, for example, a core network device in 5G.

It should be noted that description of the information included in a configuration update command message in the embodiments of the present invention is only an example rather than a limitation. In addition, the wireless communication method of the embodiments of the present invention can be applied to all scenarios in which the configuration update command message instructs a terminal device to release a non-access stratum NAS signaling connection with a network device and initiates a mobile registration update procedure, no matter what information (or parameters) is included in the configuration update command message.

The technical solutions provided by the embodiments of the present invention are hereinafter described in detail with reference to the accompanying drawings.

Figure 1:
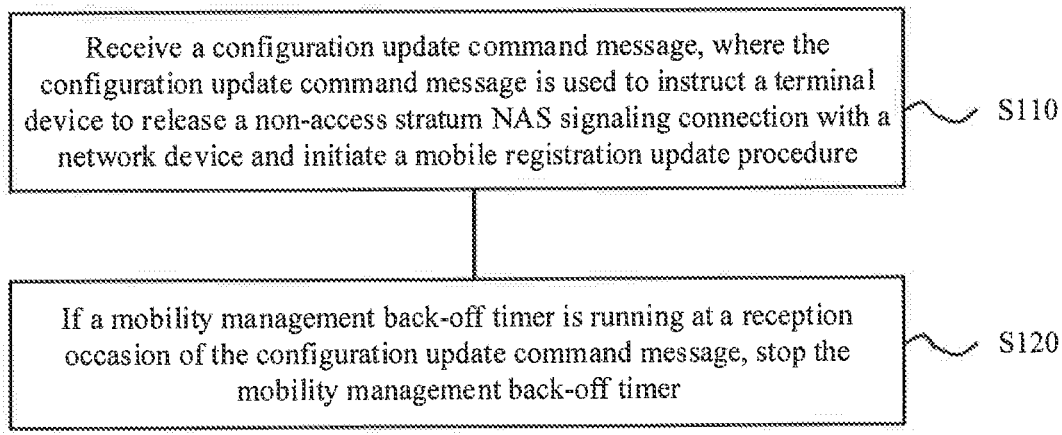
FIG. 1 is a schematic flowchart of a wireless communication method according to an embodiment of the present invention.

FIG. 1 is a wireless communication method according to an embodiment of this disclosure. The method shown in FIG. 1 can be executed by a terminal device. As shown in FIG. 1, the method includes:

S110. Receive a configuration update command message, where the configuration update command message is used to instruct the terminal device to release a non-access stratum NAS signaling connection with a network device and initiate a mobile registration update procedure.

Optionally, in S110, the configuration update command message includes a registration requested indication. Alternatively, further, the configuration update command message further includes at least one of allowed network slice selection assistance information (Allowed NSSAI) and configured network slice selection assistance information (Configured NSSAI). This means that the configuration update command message includes the registration requested indication and at least one of the allowed NSSAI and the configured NSSAI. Alternatively, further, the configuration update command message further includes a network slicing indication information element (IE).

In other words, the configuration update command message includes a registration requested indication, or the configuration update command message includes a registration requested indication and allowed NSSAI, or the configuration update command message includes a registration requested indication and configured NSSAI, or the configuration update command message includes a registration requested indication, allowed NSSAI, and configured NSSAI, or the configuration update command message includes a registration requested indication and a network slicing indication IE.

Further, in addition to the foregoing information, the configuration update command message may further include other information. The other information may include, but is not limited to, for example, 5G-globally unique temporary UE identity (GUTI), a tracking area identifier (TAI) list, local area data network (LADN) information.

It can be understood that in S110, the configuration update command message is transmitted by a core network device, for example, by an access and mobility management function (AMF) in the core network device to the terminal device. The configuration update command message can be transparently transmitted to the terminal device through an access network device (for example, a 5G base station).

S120. If a mobility management back-off timer is running at a reception occasion of the configuration update command message, stop the mobility management back-off timer.

In S120, the mobility management back-off timer (MM back-off Timer) may be a timer added by a core network device in a rejection message when the core network device, being overloaded, rejects a NAS request message of a terminal device. For example, the mobility management back-off timer can be a T3346 timer. The core network device rejects any NAS request initiated by the terminal device before the mobility management back-off timer expires.

In S120, the mobility management back-off timer being running at a reception occasion of the configuration update command message can also be understood that the mobility management back-off timer does not expire at the reception occasion of the configuration update command message. The mobility management back-off timer can be counted up or counted down.

Optionally, in some embodiments, the method shown in FIG. 1 further includes: initiating the mobile registration update procedure after stop of the mobility management back-off timer and release of the NAS signaling connection.

Optionally, in some embodiments, the terminal device executes a configuration update procedure related to the configuration update command message before release of the NAS signaling connection. Alternatively, it can be understood that the terminal device initiates the mobile registration update procedure after stop of the mobility management back-off timer, completion of the configuration update procedure, and release of the NAS signaling connection.

Specifically, when receiving the configuration update command, the terminal device may first stop the mobility management back-off timer, and then execute the configuration update procedure. When the configuration update procedure is completed, the NAS signaling connection is released. Alternatively, when receiving the configuration update command, the terminal device first completes the configuration update procedure, releases the NAS signaling connection, and then stops the mobility management back-off timer.

Figure 2:
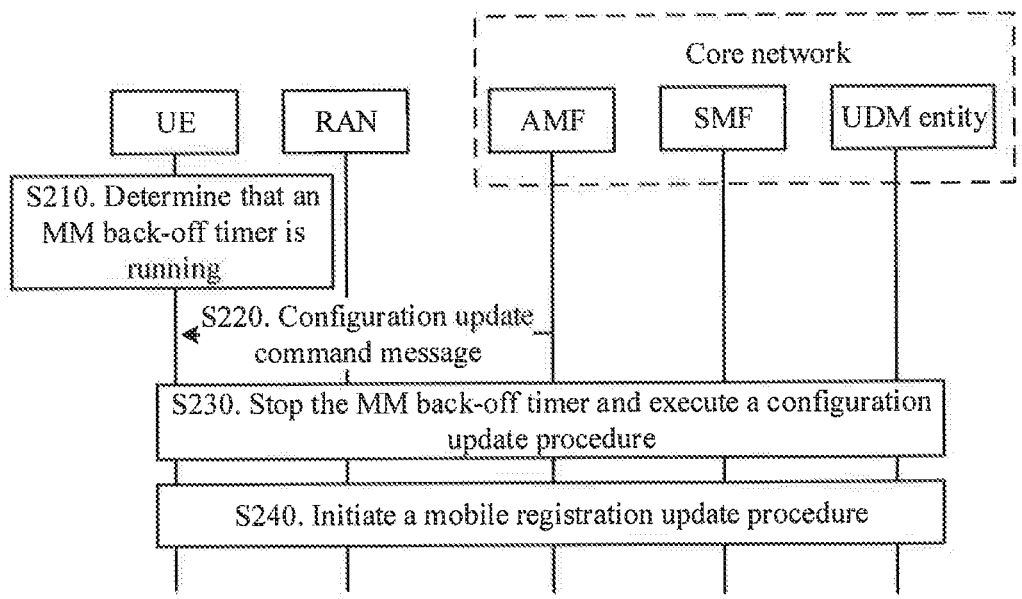
FIG. 2 is a schematic flowchart of a wireless communication method according to a specific embodiment of the present invention.

FIG. 2 is a wireless communication method according to a specific embodiment of the present invention. As shown in FIG. 2, the method includes:

S210. A terminal device UE determines that an MM back-off timer is running.

S220. An AMF transmits a configuration update command message to the terminal device.

The configuration update command message in S220 is used to instruct the terminal device to release a NAS signaling connection with a network device and initiate a mobile registration update procedure.

Optionally, as an example, the configuration update command message includes a registration requested indication, or the configuration update command message includes a registration requested indication and allowed NSSAI, or the configuration update command message includes a registration requested indication and configured NSSAI, or the configuration update command message includes a registration requested indication, allowed NSSAI, and configured NSSAI, or the configuration update command message includes a registration requested indication and a network slicing indication IE.

Further, in addition to the foregoing information, the configuration update command message may further include other information. The other information may include, but is not limited to, for example, 5G-GUTI, a TAI list, and LADN Information.

S230. The terminal device stops the MM back-off timer and executes a configuration update procedure.

It can be understood that the terminal device executes and completes the configuration update procedure through signaling interaction with a radio access network (RAN), a core network (including the AMF, a session management function (SMF), and a unified data management (UDM) entity).

S240. The terminal device initiates a mobile registration update procedure.

Similarly, the terminal device initiates and completes the mobile registration update procedure through signaling interaction with the RAN, AMF, SMF, and UDM entities.

The wireless communication method according to the embodiments of the present invention is described above in detail with reference to FIG. 1 and FIG. 2. The wireless communication method according to another embodiment of the present invention is described below in detail with reference to FIG. 3. It can be understood that interaction between the network device and the terminal device described from a network device perspective is the same as the description from the terminal device perspective in the method shown in FIG. 1 and FIG. 2. Therefore, relevant description is appropriately omitted to avoid repetition.

Figure 3:
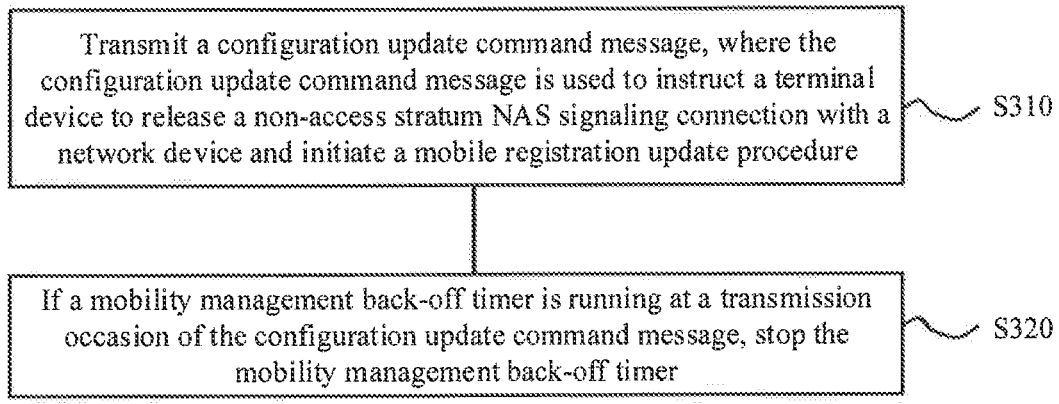
FIG. 3 is a schematic flowchart of a wireless communication method according to another embodiment of the present invention.

FIG. 3 shows a wireless communication method according to another embodiment of the present invention. The method shown in FIG. 3 can be executed by a network device. As shown in FIG. 3, the method includes:

S310. Transmit a configuration update command message, where the configuration update command message is used to instruct a terminal device to release a non-access stratum NAS signaling connection with the network device and initiate a mobile registration update procedure.

Optionally, in some embodiments, the network device may transmit the configuration update command message to the terminal device when a network congestion level meets a specified condition. For example, the network device may transmit the configuration update command message to the terminal device when the network congestion level is lower than a preset congestion level.

Alternatively, the network device may transmit the configuration update command message to the terminal device when determining that there is a resource reserved for the terminal device.

S320. If a mobility management back-off timer is running at a transmission occasion of the configuration update command message, stop the mobility management back-off timer.

The network device may stop the mobility management back-off timer before transmitting the configuration update command message. Alternatively, the network device may stop the mobility management back-off timer while transmitting the configuration update command message. After stopping the mobility management back-off timer, the network device can accept a NAS request message initiated by the terminal device.

According to the wireless communication method of the embodiments of the present invention, the network device determines whether the mobility management back-off timer is running at the transmission occasion of the configuration update command message. If the mobility management back-off timer is running, the network device stops the mobility management back-off timer. Therefore, the problem can be avoided that the terminal device cannot initiate a mobile registration update procedure and in turn cannot restore a to-be-restored service or perform any subsequent services when a NAS request message from the terminal device is rejected because the mobility management back-off timer is running.

Optionally, as an embodiment, the configuration update command message includes a registration requested indication.

Optionally, as an embodiment, the configuration update command message further includes at least one of allowed network slice selection assistance information and configured network slice selection assistance information.

Optionally, as an embodiment, the configuration update command message further includes a network slicing indication information element.

The wireless communication method according to the embodiments of the present invention is described above in detail with reference to FIG. 1 to FIG. 3, and the terminal device according to the embodiments of the present invention is described below in detail with reference to FIG. 4.

Figure 4:
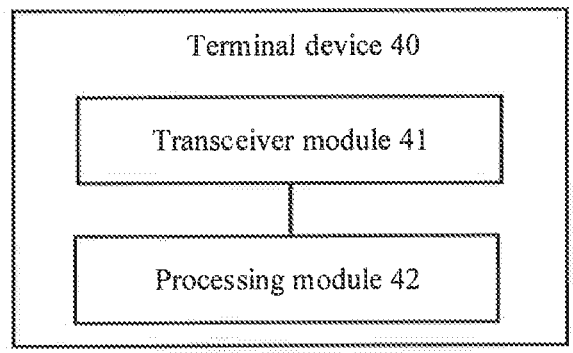
FIG. 4 is a schematic structural diagram of a terminal device according to an embodiment of the present invention.

FIG. 4 is a schematic structural diagram of a terminal device according to an embodiment of the present invention. As shown in FIG. 4, the terminal device 40 includes:

a transceiver module 41, configured to receive a configuration update command message, where the configuration update command message is used to instruct the terminal device to release a non-access stratum NAS signaling connection with a network device and initiate a mobile registration update procedure; and a processing module 42, configured to, if a mobility management back-off timer is running at a reception occasion of the configuration update command message, stop the mobility management back-off timer.

According to the embodiments of the present invention, the terminal device receives the configuration update command message used to instruct the terminal device to release a NAS signaling connection with the network device and initiate a mobile registration update procedure, and determines whether the mobility management back-off timer is running at the reception occasion of the configuration update command message. If the mobility management back-off timer is running, the terminal device stops the mobility management back-off timer. Therefore, the problem can be avoided that the terminal device cannot restore a to-be-restored service or perform any subsequent services when the terminal device receives a configuration update command message during running of the mobility management back-off timer but cannot initiate a mobile registration update procedure.

Optionally, as an embodiment, the processing module 42 is further configured to:

after stop of the mobility management back-off timer and release of the NAS signaling connection, initiate the mobile registration update procedure.

Optionally, as an embodiment, the configuration update command message includes a registration requested indication.

Optionally, as an embodiment, the configuration update command message further includes at least one of allowed network slice selection assistance information and configured network slice selection assistance information.

Optionally, as an embodiment, the configuration update command message further includes a network slicing indication information element.

Optionally, as an embodiment, the processing module 42 is further configured to: before release of the NAS signaling connection, execute a configuration update procedure related to the configuration update command message.

The terminal device provided by this embodiment of the present invention may implement the processes implemented by the terminal device in the method embodiment in FIG. 1, and details are not described herein again to avoid repetition.

Figure 5:
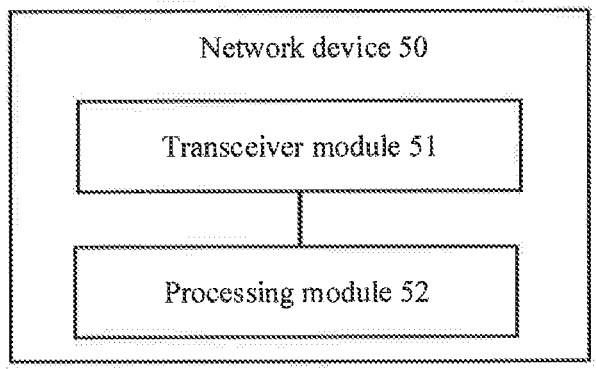
FIG. 5 is a schematic structural diagram of a network device according to an embodiment of the present invention.

FIG. 5 is a schematic structural diagram of a network device according to an embodiment of the present invention. As shown in FIG. 5, the network device 50 includes:

a transceiver module 51, configured to transmit a configuration update command message, where the configuration update command message is used to instruct a terminal device to release a non-access stratum NAS signaling connection with the network device and initiate a mobile registration update procedure; and a processing module 52, configured to, if a mobility management back-off timer is running at a transmission occasion of the configuration update command message, stop the mobility management back-off timer.

According to the embodiments of the present invention, the network device determines whether the mobility management back-off timer is running at the transmission occasion of the configuration update command message. If the mobility management back-off timer is running, the network device stops the mobility management back-off timer. Therefore, the problem can be avoided that the terminal device cannot initiate a mobile registration update procedure and in turn cannot restore a to-be-restored service or perform any subsequent services when a NAS request message from the terminal device is rejected because the mobility management back-off timer is running.

Optionally, as an embodiment, the configuration update command message includes a registration requested indication.

Optionally, as an embodiment, the configuration update command message further includes at least one of allowed network slice selection assistance information and configured network slice selection assistance information.

Optionally, as an embodiment, the configuration update command message further includes a network slicing indication information element.

The network device provided in this embodiment of the present invention can implement the processes implemented by the network device in the method embodiments in FIG. 2 and FIG. 3. To avoid repetition, details are not described herein again.

Figure 6:
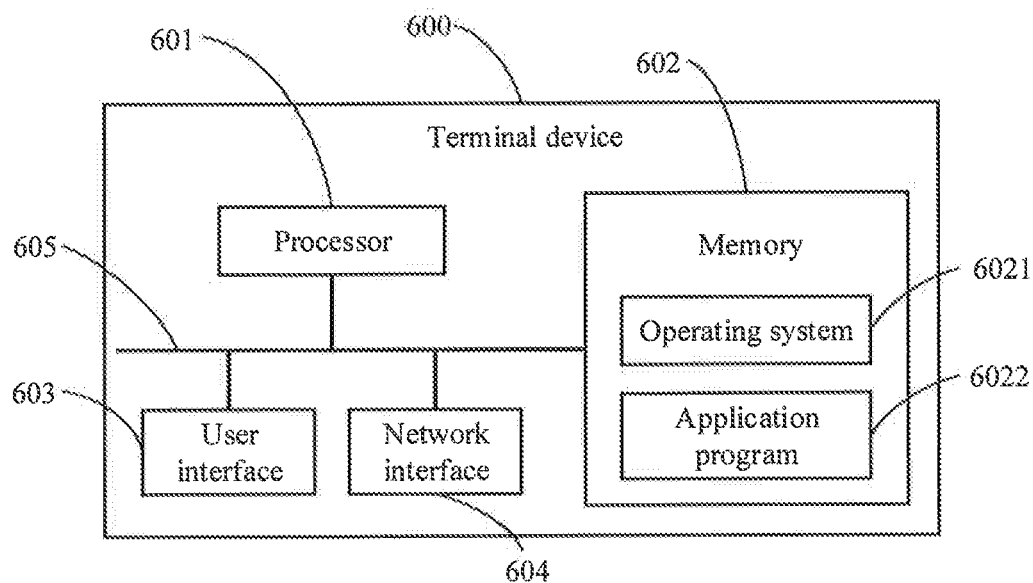
FIG. 6 is a schematic structural diagram of a terminal device according to another embodiment of the present invention.

FIG. 6 is a block diagram of a terminal device according to another embodiment of the present invention. The terminal device 600 shown in FIG. 6 includes at least one processor 601, a memory 602, a user interface 603, and at least one network interface 604. The components in the terminal device 600 are coupled together through a bus system 605. It can be understood that the bus system 605 is used to implement connection and communication between these components. In addition to a data bus, the bus system 605 further includes a power bus, a control bus, and a status signal bus. However, for clarity of description, various buses are marked as the bus system 605 in FIG. 6.

The user interface 603 may include a display, a keyboard, or a pointing device (for example, a mouse, a trackball, a touch panel, or a touchscreen).

It can be understood that the memory 602 in this embodiment of the present invention may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (Synchlink DRAM, SLDRAM), and a direct Rambus random access memory (DRRAM). The memory 602 of the system and the method described in the embodiments of the present invention is intended to include without limitation these and any other suitable types of memories.

In some implementations, the memory 602 stores the following elements: an executable module or a data structure, or a subset thereof, or an extended set thereof, namely an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player and a browser, which are used to implement various application services. A program for implementing the method in this embodiment of the present invention may be included in the application program 6022.

In this embodiment of the present invention, the terminal device 600 further includes: a computer program that is stored in the memory 602 and that can run on the processor 601, where when the computer program is executed by the processor 601, the processes of the method described above with reference to FIG. 1 are implemented, and the same technical effect can be achieved. Details are not described herein again to avoid repetition.

The method disclosed in the foregoing embodiments of the present invention may be applied to the processor 601 or implemented by the processor 601. The processor 601 may be an integrated circuit chip that has a signal processing capability. During implementation, the steps of the foregoing method may be completed by hardware integrated logic circuits in the processor 601 or instructions in the form of software. The foregoing processor 601 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly performed and completed by using a hardware decoding processor, or may be performed and completed by using a combination of hardware and a software module in a decoding processor. The software module may be located in a mature computer-readable storage medium in the art, such as a random access memory, a flash memory, a read-only memory, a programmable read-only memory, an electrically erasable programmable memory, or a register. The computer-readable storage medium is located in the memory 602, and the processor 601 fetches information from the memory 602, and completes the steps of the foregoing method in combination with its hardware. Specifically, the computer-readable storage medium stores a computer program, where when the computer program is executed by the processor 601, the steps in the method embodiment described above with reference to FIG. 1 are implemented.

It can be understood that the embodiments described in the embodiments of the present invention may be implemented by hardware, software, firmware, middleware, microcode, or a combination thereof. For hardware implementation, the processing unit may be implemented in one or more application-specific integrated circuits (ASICs), a digital signal processor (DSP), a digital signal processing device (DSPD), a programmable logic device (PLD), a field-programmable gate array (FPGA), a general-purpose processor, a controller, a microcontroller, a microprocessor, another electronic unit for executing the functions described in the present invention, or a combination thereof.

For software implementation, the technologies described in the embodiments of the present invention may be implemented by modules (for example, processes or functions) that perform the functions described in the embodiments of the present invention. Software code may be stored in the memory and executed by the processor. The memory may be implemented in or outside the processor.

Figure 7:
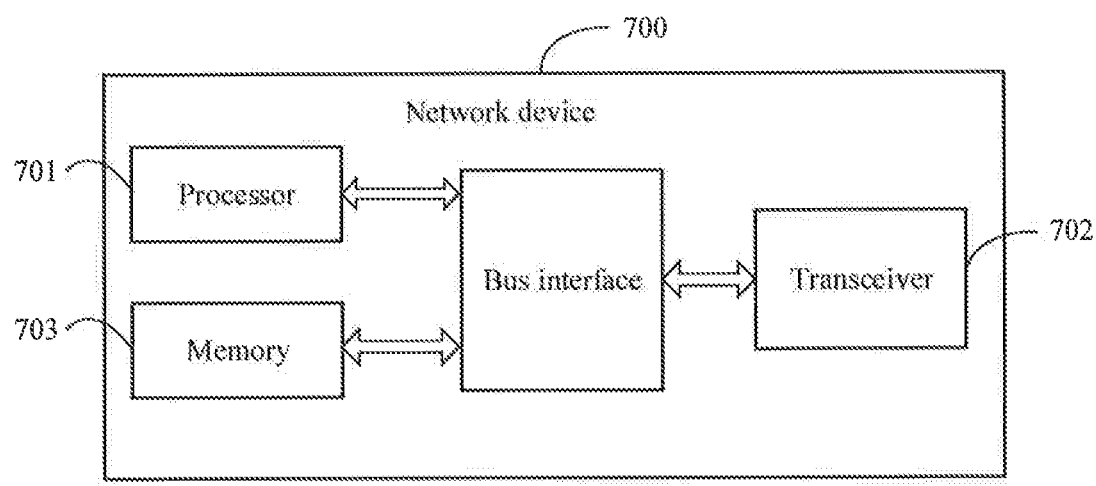
FIG. 7 is a schematic structural diagram of a network device according to another embodiment of the present invention.

FIG. 7 is a schematic structural diagram of a network device according to another embodiment of the present invention. As shown in FIG. 7, the network device 700 includes a processor 701, a transceiver 702, a memory 703, and a bus interface.

In this embodiment of the present invention, the network device 700 further includes: a computer program that is stored in the memory 703 and that can run on the processor 701. When the computer program is executed by the processor 701, the processes of the method described above with reference to FIG. 3 are implemented, and the same technical effect can be achieved. Therefore, details are not described herein again to avoid repetition.

In FIG. 7, a bus architecture may include any quantity of interconnected buses and bridges, and specifically connect together various circuits of one or more processors represented by the processor 701 and a memory represented by the memory 703. The bus architecture may further interconnect various other circuits such as a peripheral device, a voltage regulator, and a power management circuit. These are all commonly known in the art, and therefore are not further described in this specification. The bus interface provides interfaces. The transceiver 702 may be a plurality of components, including a transmitter and a receiver, and provides units configured to communicate with various other apparatuses over a transmission medium.

The processor 701 is responsible for management of the bus architecture and general processing, and the memory 703 may store data for use by the processor 701 when the processor 701 performs an operation.

An embodiment of the present invention further provides a computer-readable storage medium, where the computer-readable storage medium stores a computer program, and when the computer program is executed by a processor, the processes of the method described above with reference to FIG. 1 to FIG. 3 are implemented, and the same technical effect can be achieved. Therefore, details are not described herein again to avoid repetition. For example, the computer-readable storage medium is a read-only memory (ROM), a random access memory (RAM), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the related art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to the embodiments. The embodiments are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. A wireless communication method, applied to a terminal device and comprising:
    receiving a configuration update command message, wherein the configuration update command message is used to instruct the terminal device to release a non-access stratum NAS signaling connection with a network device and initiate a mobile registration update procedure; and
    if a mobility management back-off timer is running at a reception occasion of the configuration update command message, stopping the mobility management back-off timer,
    wherein the method further comprises: after stop of the mobility management back-off timer and release of the NAS signaling connection, initiating the mobile registration update procedure,
    wherein the mobility management back-off timer is a timer added by a core network device in a rejection message when the core network device, being overloaded, rejects a NAS request message from the terminal device.

2. The method according to claim 1, wherein the configuration update command message comprises a registration requested indication.

3. The method according to claim 2, wherein the configuration update command message further comprises at least one of allowed network slice selection assistance information and configured network slice selection assistance information.

4. The method according to claim 2, wherein the configuration update command message further comprises a network slicing indication information element.

5. The method according to claim 1, further comprising:
    before release of the NAS signaling connection, executing a configuration update procedure related to the configuration update command message.

6. A wireless communication method, applied to a network device and comprising:
    transmitting a configuration update command message, wherein the configuration update command message is used to instruct a terminal device to release a non-access stratum NAS signaling connection with the network device and initiate a mobile registration update procedure; and
    if a mobility management back-off timer is running at a transmission occasion of the configuration update command message, stopping the mobility management back-off timer, to cause the network device to, after stop of the mobility management back-off timer, accept a NAS request message initiated by the terminal device,
    wherein the mobility management back-off timer is a timer added by a core network device in a rejection message when the core network device, being overloaded, rejects a NAS request message from the terminal device.

7. The method according to claim 6, wherein the configuration update command message comprises a registration requested indication.

8. The method according to claim 7, wherein the configuration update command message further comprises at least one of allowed network slice selection assistance information and configured network slice selection assistance information.

9. The method according to claim 7, wherein the configuration update command message further comprises a network slicing indication information element.

10. A terminal device, comprising: a memory, a processor, and a computer program that is stored in the memory and that can run on the processor, wherein when the computer program is executed by the processor, following steps of a wireless communication method are implemented:
    receiving a configuration update command message, wherein the configuration update command message is used to instruct the terminal device to release a non-access stratum NAS signaling connection with a network device and initiate a mobile registration update procedure; and
    if a mobility management back-off timer is running at a reception occasion of the configuration update command message, stopping the mobility management back-off timer,
    wherein when the computer program is executed by the processor a following step is further implemented:
    after stop of the mobility management back-off timer and release of the NAS signaling connection, initiating the mobile registration update procedure,
    wherein the mobility management back-off timer is a timer added by a core network device in a rejection message when the core network device, being overloaded, rejects a NAS request message from the terminal device.

11. The terminal device according to claim 10, wherein the configuration update command message comprises a registration requested indication.

12. The terminal device according to claim 11, wherein the configuration update command message further comprises at least one of allowed network slice selection assistance information and configured network slice selection assistance information.

13. The terminal device according to claim 11, wherein the configuration update command message further comprises a network slicing indication information element.

14. The terminal device according to claim 10, wherein when the computer program is executed by the processor, a following step is further implemented:
    before release of the NAS signaling connection, executing a configuration update procedure related to the configuration update command message.

15. A network device, comprising: a memory, a processor, and a computer program that is stored in the memory and that can run on the processor, wherein when the computer program is executed by the processor, the steps of the wireless communication method according to claim 6 are implemented.

16. The network device according to claim 15, wherein the configuration update command message comprises a registration requested indication.

17. The network device according to claim 16, wherein the configuration update command message further comprises at least one of allowed network slice selection assistance information and configured network slice selection assistance information.

18. The network device according to claim 16, wherein the configuration update command message further comprises a network slicing indication information element.

* * * * *